United States Patent Office 2,836,770
Patented May 27, 1958

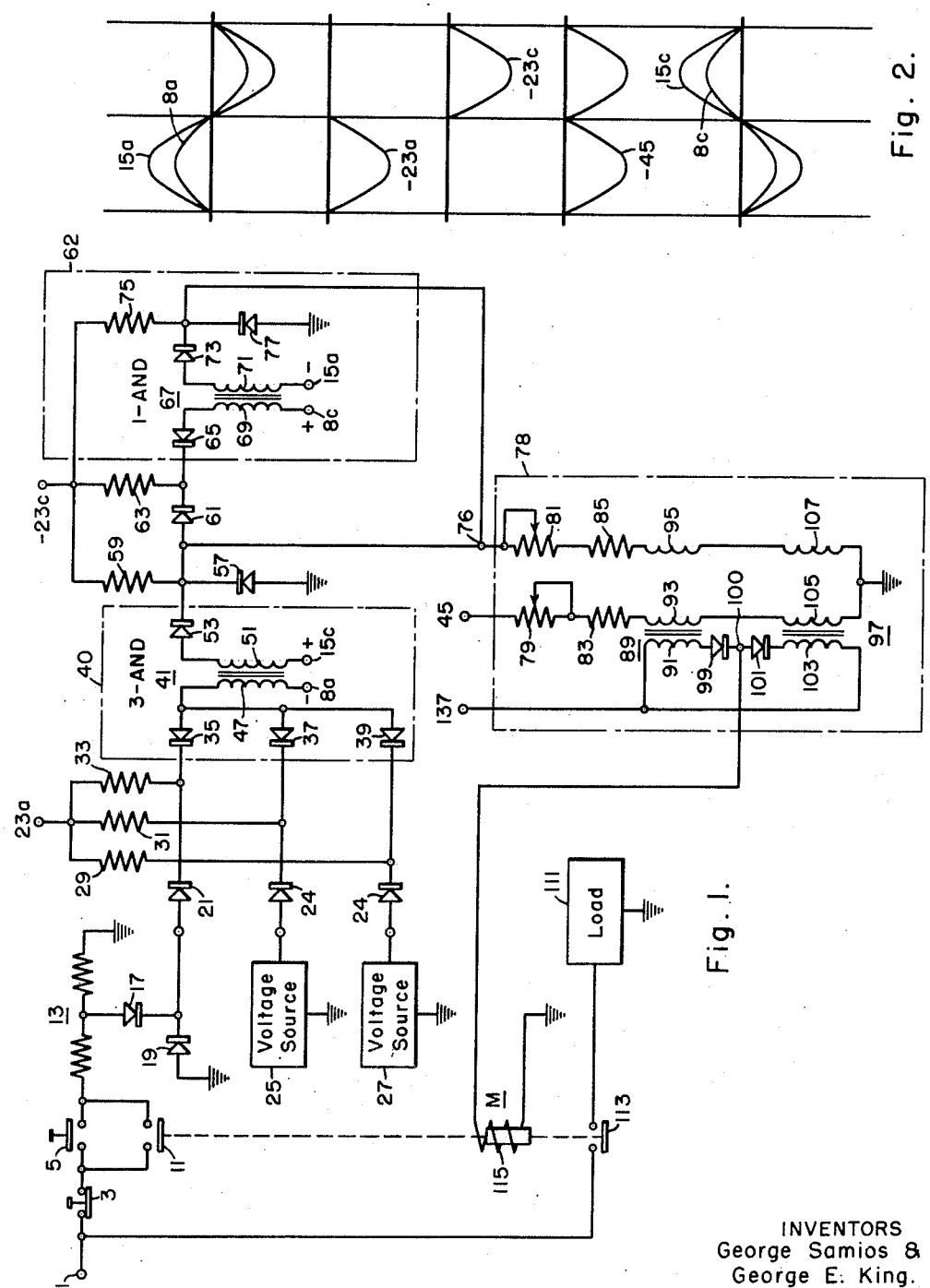

2,836,770
ELECTRICAL CONTROL CIRCUIT
George Samios, Tonawanda, and George E. King, Eggertsville, N. Y., assignors to Westinghouse Electric Corporation, East Pittsburgh, Pa., a corporation of Pennsylvania Application August 29, 1956, Serial No. 606,859
4 Claims. (Cl. 317—31)

This invention refers to control systems for relay actuation such as are utilized in the control of electrical motors and like devices, and more specifically to such control systems incorporating low voltage protection features.

There exists in the art a need for a simple reliable system for the control of an electromagnetic device such as a relay by the simultaneous application of signals from a plurality of control sources. Devices that have been used in the past suffer either from undue complexity or are not entirely reliable in operation. In order to function properly in such conditions as are encountered in industrial applications, the system must operate under extremely adverse conditions of vibration, dirt and rough treatment by relatively unskilled operators.

An object of this invention is to provide a control system for an actuation of a relay upon the simultaneous energization of the system by control signals from a predetermined number of control signal sources.

Another object is to provide such a control system that will automatically drop out a relay when a low voltage condition exists in the alternating current supply system controlled by the relay.

Still another object is to provide such a control system adapted for use under unfavorable operating conditions.

Other objects and features of the invention will become apparent upon consideration of the following detailed description thereof when taken in connection with the accompanying drawing wherein:

Figure 1 is a schematic diagram of a preferred embodiment of the invention; and

Fig. 2 depicts wave-form representations of voltages as simultaneously measured at various points in the system of Fig. 1.

The invention to be described makes use of a type of magnetic amplifier described in the article by R. A. Ramey appearing in AIEE Transactions, volume 70, part 2, 1951, entitled "On the control of magnetic amplifiers." This magnetic amplifier has been styled the "reset" type and comprises a magnetic core having high remanence on which are wound a power or output winding and a reset winding. An alternating voltage source is coupled to these windings by means of rectifiers, which rectifiers are poled so that on first alternate half cycles of the alternating voltage, the voltage applied to the load winding is of such a polarity as to drive the magnetization level of the core towards saturation, and on second alternate half cycles of the alternating voltage the voltage is applied to the control winding to "reset" or withdraw the magnetization level of the reactor from saturation. A control voltage or other control element is connected in series with the alternating voltage source and the control winding to control the magnetization level set by the control winding on reset half cycles. After the saturable core has become saturated during the half cycle of voltage application to the load winding, the impedance presented thereby will drop from a very high value to a very low value and the voltage across a load impedance connected in series with the load winding will rise sharply to substantially the same value as that of the alternating voltage source. The time integral of voltage developed across the load impedance, therefore, will be determined by the magnetization level set in the core during the half cycle of voltage application to the control winding. Inasmuch as this magnetization level is a function of the control voltage in series with the control winding, the time integral of voltage developed across the load impedance will be functionally related to the control voltage applied to the control winding.

With reference now to Fig. 1, there is shown a relay M which is to be controlled by the circuitry to be described. This relay has a control winding 115, a contact member 113 for controlling the application of power from alternating current terminal 1 to ground through a load 111 which may be the armature or field winding of a motor. A reset type magnetic amplifier 40 is provided having a saturable high remanence magnetic core 41, a reset winding 47 and a load winding 51. An alternating voltage source is connected to terminal 8a and to ground. The other terminal of the reset winding 47 is coupled to the anodes of half-wave rectifiers 35, 37 and 39. Terminal 1 is coupled to the anode of rectifier 35 through stop push button 3, the parallel-connected combination of start push button 5 and contact member 11, voltage divider 13, half-wave rectifier 17 and half-wave rectifier 21. Negative voltage pulses applied to terminal 23a are coupled to the junction of rectifiers 21 and 35. The junction of the cathode of half-wave rectifier 17 and the anode of half-wave rectifier 21 are connected to the anode of half-wave rectifier 19, the cathode of which is connected to ground. Control voltage sources 25 and 27 are coupled to the cathodes of rectifiers 37 and 39 respectively by half-wave rectifiers 24 and 28, respectively. Terminal 23a is connected to the junction of rectifiers 34 and 37 by resistor 31 and to the junction of rectifiers 24 and 29 by resistor 39. An alternating voltage that is 180° out of phase with the voltage applied to terminal 8a is applied to terminal 15c. This phaseal relation is depicted by the wave-form representations of Fig. 2.

The control circuitry described above will be recognized as an AND circuit. Closure of normally-open start push button 5 will apply voltage pulses to the reset winding 47 that will tend to prevent resetting of the core 41 by the alternating voltage applied to terminal 8a. However, unless voltage pulses are also simultaneously applied from control voltage sources 25 and 27, resetting still will occur. Only when voltage pulses are simultaneously applied to the reset winding by control voltage sources 25 and 27 and by the closure of start push button 5 will resetting take place and voltage pulses appear at the output of the magnetic amplifier 40. Voltage pulses from magnetic amplifier 40 appear across half-wave rectifier 57. These pulses are coupled to the reset circuit of magnetic amplifier 62 (which comprises reset winding 69 and half-wave rectifier 65) by means of half-wave rectifier 61. The alternating voltage source coupled between terminal 8c of reset winding 69 and ground is reversed in phase to that applied to terminal 8a as shown in Fig. 2. Similarly, the alternating voltage applied to 15a is reversed in phase to that applied to terminal 15c, likewise as shown in Fig. 2. In this manner the output pulses from magnetic amplifier 40 will block resetting of the core of magnetic amplifier 62 so as to produce output pulses in the load circuit across output amplifier 78. The output pulses appearing across rectifiers 57 and 77 are combined so as to produce a full-wave rectified voltage signal at terminal 76.

Magnetic amplifier 78 is of the so-called self-saturating type such as described in U. S. Patent No. 2,743,405 granted to G. E. King et al. The voltage pulses appearing between terminals 76 and ground are applied to the pattern windings 95 and 107 of magnetic amplifier 78. The bias windings 93 and 105 are connected to a source of bias potential 45. The load windings 91 and 103 are coupled between alternating voltage terminal 137 and output terminal 100 by half-wave rectifiers 95 and 101, respectively. (The other terminals of the alternating voltage sources mentioned above are understood to be connected to ground.) An output voltage will appear at terminal 100 that will be controlled by the full-wave rectified voltage pulses appearing at terminal 76. The output voltage appearing at terminal 100 is connected to one terminal of relay winding 115, the other terminal of winding 115 being connected to ground.

In operation let it be assumed that stop push button 3 is closed so that closure of start push button 5 will apply one input signal to magnetic amplifier 40. Assuming that control voltage sources 25 and 27 are likewise applying signals to magnetic amplifier 40, half-wave rectified voltage pulses will be coupled to terminal 76 from the output of magnetic amplifier 40. These voltage pulses will energize magnetic amplifier 52 so as to produce voltage pulses therefrom which are 180° out of phase therewith and of the same polarity. Magnetic amplifier 78 will be energized to further energize relay winding 115 and close contact members 11 and 113. Start push button 5 may now be released and the relay will remain in its actuated position due to the closure of contact member 11.

Should the output voltage of the alternating voltage source decrease in magnitude, the output of magnetic amplifier 78 will also drop off. Therefore, the average current through relay winding 115 will decrease. At a predetermined average current, relay M will drop out opening contact 11 and positively cutting off the output voltages produced by magnetic amplifiers 40, 62 and 78.

Since certain changes may be made in the above-described construction and different embodiments of the invention may be made without departing from the spirit and scope thereof, it is intended that all the matter contained in the above description and shown in the accompanying drawing shall be considered as illustrative and not in a limiting sense.

We claim as our invention:

1. In a system of control for actuating a relay having an actuating coil and at least one normally open contact means in response to closure of manually actuated switch means and simultaneous application of the output signals of a predetermined number of control signal sources; first magnetic amplifier means operatively connected to said switch means for generating a full-wave rectified output signal responsive to closure of said switch means and the simultaneous application of said output signals from said predetermined number of control signal sources; second magnetic amplifier means operatively connected to said relay for energizing said actuating coil in response to said full-wave rectified output signal from said first magnetic amplifier means; with said contact means being connected to short circuit said manually-actuable switch means upon energization of said actuating coil; and with said second magnetic amplifier means being coupled to an alternating current source for supplying energizing power to said actuating coil, and being further adapted to drop out said relay to deenergize said coil when the voltage of said alternating current source drops lower than a predetermined magnitude.

2. In a system of control for actuating a relay in response to the closure of a manually actuated switch and simultaneous application of output signals from a predetermined number of control signal means, said relay having an actuating coil and at least one normally open contact means; an alternating voltage source; first and second magnetic amplifier means; each of said magnetic amplifier means having at least first and second winding means on magnetic core means, and adapted to generate an output voltage pulse as an inverse function of the magnitude of reset of said magnetic core from saturation in a given sense; means coupling said first magnetic amplifier to said alternating voltage source adapted to reset the core thereof from saturation in a given sense on first alternate half cycles of said source; means coupling said second magnetic amplifier to said source to rest said core thereof from saturation in a given sense on second alternate half cycles of said source; means coupling said switch and said control signal means to said first winding means of said first magnetic amplifier adapted to block reset of said core thereof upon simultaneous closure of said switch and simultaneous application of output signals from a predetermined number of control signal means, means coupling the output of said first magnetic amplifier means to said first winding means of said second magnetic amplifier adapted to block reset of the magnetic core of said second magnetic amplifier on second alternate half cycles of said source to derive output pulses from said second magnetic amplifier on first alternate half cycles of said source, third magnetic amplifier means responsive to the combined output signals of said first and second magnetic amplifier means to energize said actuating coil; said contact means being connected in parallel with said manually actuated switch.

3. In a system of control for actuating a relay in response to closure of a manually actuated switch and simultaneous application of the output of a predetermined number of control signal means; said relay having an actuating coil and at least one normally open contact means; first and second reset-type magnetic amplifier means of the type adapted to generate an output signal over a portion of first alternate half cycles of an alternating current source connected thereto as an inverse function of the magnitude of reset of the magnetization level of a magnetic source over second alternate half cycles of said source, control signal means coupled thereto of at least a predetermined magnitude; means coupling said manually closed switch and said predetermined number of control signal means to said first magnetic amplifier adapted to reset said magnetization level only upon simultaneous closure of said switch means and appearance of an output signal from each of said control signal means; means coupling the output of said first magnetic amplifier to said second magnetic amplifier to block reset of the magnetization level of the magnetic core means of said second magnetic amplifier upon appearance of an output signal from said first magnetic amplifier; third magnetic amplifier means responsive to the combined output signals of said first and second magnetic amplifier means to energize the acuating coil of said relay to close said normally open contact means.

4. In a system of control for actuating a relay having an actuating coil and at least one normally open contact means; first and second magnetic amplifier means of the type wherein an output voltage pulse is generated on a given first alternate half cycle of an alternating voltage source only when the magnetization level of a magnetic core thereof is prevented from being reset from saturation in a given sense on the preceding half cycle of said source; first alternate half cycles of said first magnetic amplifier corresponding to second alternate half cycles of said second magnetic amplifier and vice versa; control means for said first magnetic amplifier means for preventing resetting of the magnetic core thereof, upon simultaneous energization of a plurality of input circuits of said control means; manually operable switch means connected parallel with said contact means for energizing one of said plurality of input circuits; a plurality of control voltage sources for energizing all of said plurality of input circuits other than said one input circuit, means coupling the output of said first magnetic amplifier to said second magnetic amplifier so that output voltage pulses from said first magnetic amplifier means are adapted to block resetting of the magnetic core of said second magnetic amplifier means; third magnetic amplifier means responsive to the outputs of said first and second magnetic amplifier means to energize said actuating coil of said relay.

No references cited.